United States Patent
Valdez et al.

(10) Patent No.: US 11,950,541 B2
(45) Date of Patent: Apr. 9, 2024

(54) KNOT TIGHTENER FOR BALER TWINE

(71) Applicant: AGCO Corporation, Duluth, GA (US)

(72) Inventors: Dino Rey Valdez, Hesston, KS (US); Nathan K. Ensminger, South Hutchinson, KS (US); Bernard Dean Regier, Hesston, KS (US); Maynard M. Herron, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 119 days.

(21) Appl. No.: 17/929,259

(22) Filed: Sep. 1, 2022

(65) Prior Publication Data

US 2023/0210058 A1 Jul. 6, 2023

Related U.S. Application Data

(60) Provisional application No. 63/295,744, filed on Dec. 31, 2021.

(51) Int. Cl.
*A01F 15/14* (2006.01)
*B65H 69/04* (2006.01)

(52) U.S. Cl.
CPC .......... *A01F 15/145* (2013.01); *B65H 69/04* (2013.01); *B65H 2701/31* (2013.01)

(58) Field of Classification Search
CPC .. B25B 25/00; B25B 7/12; B25B 9/00; B25B 7/00; B65H 69/04; B65H 2701/31; B65H 69/00; A01F 15/145; A01F 15/14; A01K 97/26; A01K 91/047; D04G 3/02; H01R 43/04; H01R 43/042; B65B 27/125
USPC ............. 254/248, 249; 289/17, 18.1; 81/9.3, 81/300; 140/121, 123, 123.5, 117, 122; 473/557; 24/27, 712.1; 28/209, 211
See application file for complete search history.

(56) References Cited

U.S. PATENT DOCUMENTS

| | | | | |
|---|---|---|---|---|
| 679,870 A | * | 8/1901 | Stoddard | B25B 25/00 254/248 |
| 1,269,381 A | * | 6/1918 | Burnett | B25B 25/00 254/248 |
| 1,351,598 A | * | 8/1920 | Wise | B65B 13/285 473/557 |

(Continued)

FOREIGN PATENT DOCUMENTS

| | | |
|---|---|---|
| CN | 210200403 U | 3/2020 |
| EP | 1600415 A2 | 11/2005 |

OTHER PUBLICATIONS

UK Intellectual Property Office, Search report for related UK Application No. GB2200418.8, dated Jun. 23, 2022.

*Primary Examiner* — Nathan E Durham
*Assistant Examiner* — Abby M Spatz

(57) ABSTRACT

A knot stretcher for use in tightening splice knots that connect twine balls on an agricultural baler. The knot stretcher includes a pair of pulling bars connected at pulling bar pivot at one end of each of the pulling bars, and a pair of levers, where one of the pair of levers is attached in a middle section of its respective pulling bar. Each lever has a handle portion at one end and an arm portion extending from an elbow formed in the lever. Each lever attaches to its respective pulling bar with a fixed pivot located near the elbow and distal ends of the arm portions of the two levers are attached at a moving pivot. The knot stretcher has clamping jaws positioned on the pulling bars to securely clamp a respective one of the twine tails of the splice knot that is to be tightened.

6 Claims, 4 Drawing Sheets

(56) References Cited

U.S. PATENT DOCUMENTS

| | | | | |
|---|---|---|---|---|
| 1,367,446 A | * | 2/1921 | Witham | ................ B60C 25/142 |
| | | | | 254/248 |
| 4,236,739 A | | 12/1980 | Mista | |
| 5,913,545 A | | 6/1999 | Everingham | |
| 7,478,591 B2 | | 1/2009 | Kendrick | |

\* cited by examiner

BALER

KNOT TIGHTENER FOR BALER TWINE

BACKGROUND OF THE INVENTION

Field of Invention

This invention relates to agricultural balers, and more particularly to a device that tightens knots used to splice rolls of baling twine used on balers.

Description of Related Art

It is well known in the art to wrap compressed bales of crop materials, both "round" and "rectangular", with twine while still in the baler so as to maintain the shape and integrity of the bale after it is ejected from the baler. Twine is typically dispensed from generally cylindrical twine balls standing on end on horizontal storage shelves on the baler. The balls are usually spliced together so that when one ball is completely depleted, twine automatically starts unwrapping from the next ball without requiring operator intervention. Crop balers are provided with twine ball storage means that supports the cylindrical twine balls on their sides, with one end facing outwardly away from the baler. Among other things, having the ends of the twine balls face outwardly toward the operator makes it much easier and more convenient as he loads the storage compartment and splices the twine from one twine ball to the next twine ball.

With the desire to form bales with more densely packed crop material, it is necessary to use heavier twine and form stronger knots. The twine necessary for use in such high density balers needs to be larger than what was previously sufficient for prior art balers and is typically is stiff and slick. One problem is it is hard to tie a knot in such larger twine to spice twine balls that is small and tight. The knot needs to be small and tight enough so it can flow through the twine routing system without causing any restriction. Also it needs to be tight enough so it does not untie itself. What is needed is a mechanism that can form such small and tight knots in the twine used in high density balers.

BRIEF SUMMARY

In one aspect, the invention is directed to a knot stretcher for use in tightening splice knots that connect twine balls on an agricultural baler. The knot stretcher includes a pair of pulling bars connected at pulling bar pivot at one end of each of the pulling bars, and a pair of levers, where one of the pair of levers is attached in a middle section of its respective pulling bar. Each lever has a handle portion at one end and an arm portion extending from an elbow formed in the lever. Each lever attaches to its respective pulling bar with a fixed pivot located near the elbow and distal ends of the arm portions of the two levers are attached at a moving pivot. The knot stretcher has clamping jaws positioned on the pulling bars to securely clamp a respective one of the twine tails of the splice knot that is to be tightened.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Corresponding reference characters indicate corresponding parts throughout the views of the drawings.

DETAILED DESCRIPTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
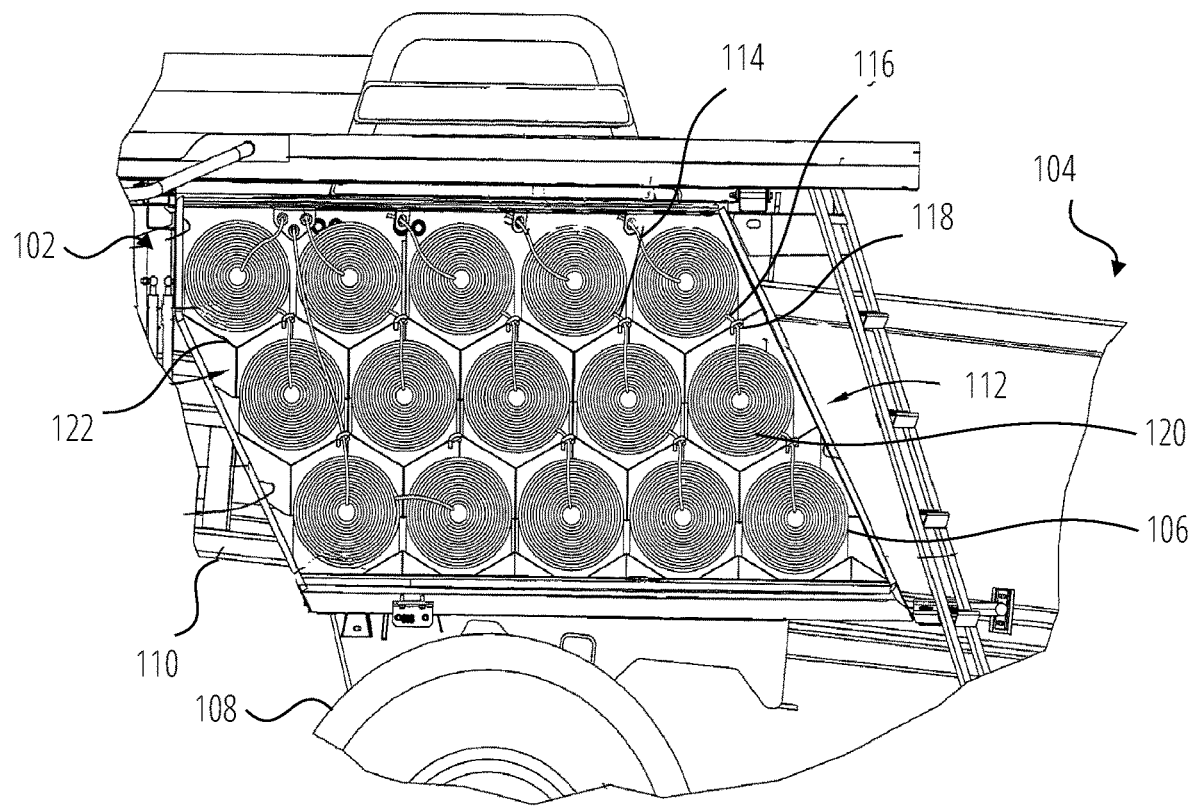
FIG. 1 is a side elevational view of a portion of a typical prior art large rectangular baler which is provided with a twine ball storage arrangement.

A prior art baler 102 chosen for illustration in FIG. 1 happens to be similar in configuration to the baler shown and described in U.S. Pat. No. 7,478,591 which is owned by the assignee of the present invention. The '591 patent is hereby incorporated by reference into the present specification, although it will be understood that the principles of the present invention are not limited to any particular type of rectangular baler and may, in fact, be utilized in conjunction with round balers as well. Suffice it to point out, therefore, that baler 102 in FIG. 2 picks up hay from the ground with a pickup (not shown) as the machine is towed through a field. Successive charges of picked up crop materials are fed up into an internal, generally fore-and-aft extending bale chamber (not shown) where they are acted upon by a reciprocating plunger that compacts the charge and pushes it rearwardly in the chamber toward a rearmost open end 104. As the charges are pushed rearwardly, opposite sides of the forming bale are squeezed by adjustable sidewalls (not shown) that cause resistance to movement, thereby causing previous charges to provide a backstop against which new charges may be compressed. After a sufficient number of charges have been compressed to provide a bale of the desired length, twine supplied from twine balls 106 carried on the baler 102 is placed around the bale and knotted so that the bale will not lose its integrity and shape after it is discharged from the baler 102 through the open end 104.

As illustrated, the baler 102 includes a pair of ground wheels 108 that support a chassis or frame 110 for movement through the field. Twine storage apparatus in the nature of a pair of twine boxes 112 are supported on opposite left and right sides of frame 110 for storing the plurality of twine balls 106 used in binding bales formed within the baler 102.

Each twine box 112 has a door (not shown) that is hinged along its top edge for swinging movement between an open position and a closed position. The fore-and-aft length of door is such that, when closed, it covers not only the twine storage area of twine box 112, but also a forward region of frame 110 in which various other components and mechanisms of the baler 102 are located.

Each twine ball 106 is generally cylindrical in overall configuration presenting an outer end 120. Each twine ball 106 is typically supplied by the manufacture in a plastic wrap (not shown) with outer end 120 exposed and with both a leading twine end 114 and a trailing twine end 116 respectively disposed adjacent the outer end 120 of the twine ball 106. Each twine ball 106 is wound in such a way that it may be unwound or paid out from the inside out by pulling on leading twine end 114. The trailing twine end 116 is thus the last part of each ball to be paid out. Suitable twine balls 106 are available from a number of sources well known to those skilled in the art. The twine balls 106 are advantageously oriented so that they lie on their sides within cradles 122 with twine-dispensing, outer ends 120 facing outwardly away from the baler 102. This permits the operator standing beside the baler 102 to have easy access to tie a splice knot in the trailing twine end 116 of one twine ball 106 and the leading twine end 114 of the next twine ball 106 for the purpose of splicing twine balls 106 together in several groups to facilitate continuous flow of twine until all of the twine balls 106 are paid out.

Figure 2:
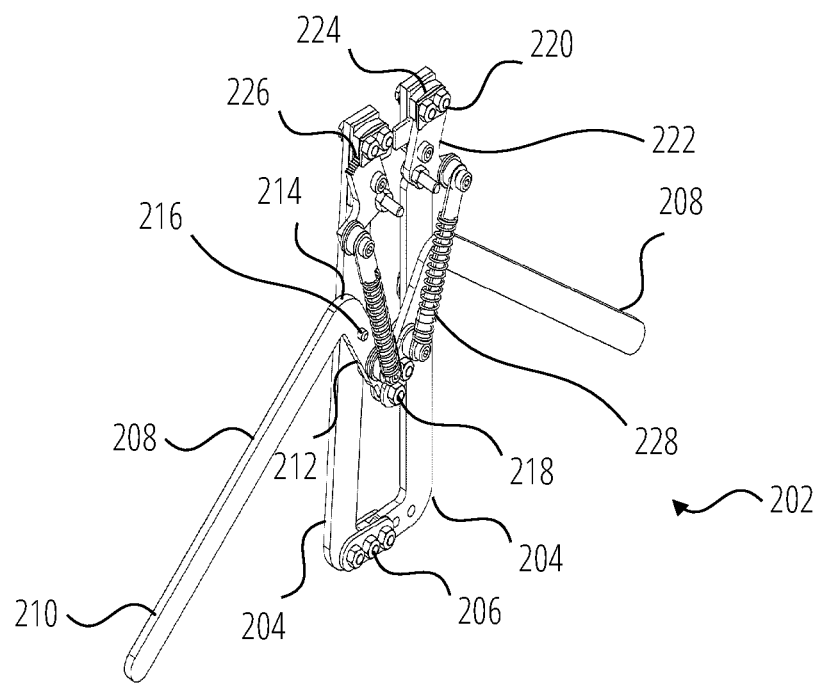
FIG. 2 is a perspective view of a twine ball splicing knot stretcher in accordance with the principles of the present invention.

FIG. 2 illustrates an embodiment of a knot stretcher 202 that is used to tighten the splice knots 118 that connect twine balls 106 on balers 102 so that the splice knots 118 are small and tight and able to pass through components of the baler 102. The knot stretcher 202 has a pair of pulling bars 204 connected at pulling bar pivot 206 at one end of each pulling bar 204. A lever 208 is attached in a respective middle section of each pulling bar 204. Each lever 208 has a handle portion 210 at one end and an arm portion 212 extending from an elbow 214 formed in the lever 208. Each lever 208 attaches to its respective pulling bar 204 with a fixed pivot 216 located near the elbow 214 of the lever 208. Distal ends of the arm portions 212 of the two levers 208 are attached at a moving pivot 218.

Figure 3:
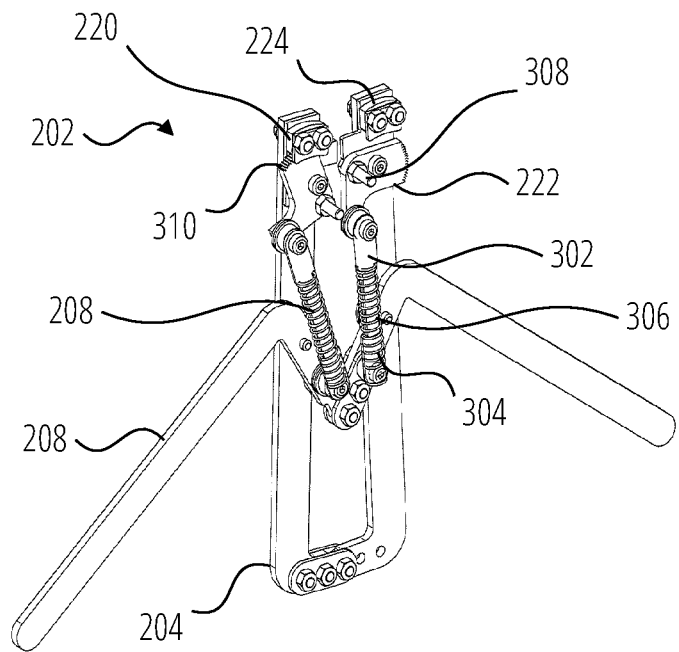
FIG. 3 is another view of the knot stretcher of FIG. 2.

Each pulling bar 204 has a clamping jaw 220 at an end opposite the end at the pulling bar pivot 206. In one embodiment, each clamping jaw 220 includes a rotating crank 222 that mates with a clamp 224 so that the clamping jaw 220 is able to securely clamp one tail of the splice knot 118 that is to be tightened by the knot stretcher 202. Desirably, the clamp 224 forms a twine-receiving groove 226 for receiving the twine tail of the splice knot 118. In the illustrated embodiment, a rod 228 extends from the arm portion 212 to the crank 222 so as to push the crank 222 against the clamp 224 so that the clamping jaw 220 tightly grasps the twine tail. Desirably, the operator can rotate the crank 222 as shown in FIG. 3 to open the clamping jaw 220 which allows the twine tail of the splice knot 118 to be inserted into the groove 226

Figure 4:
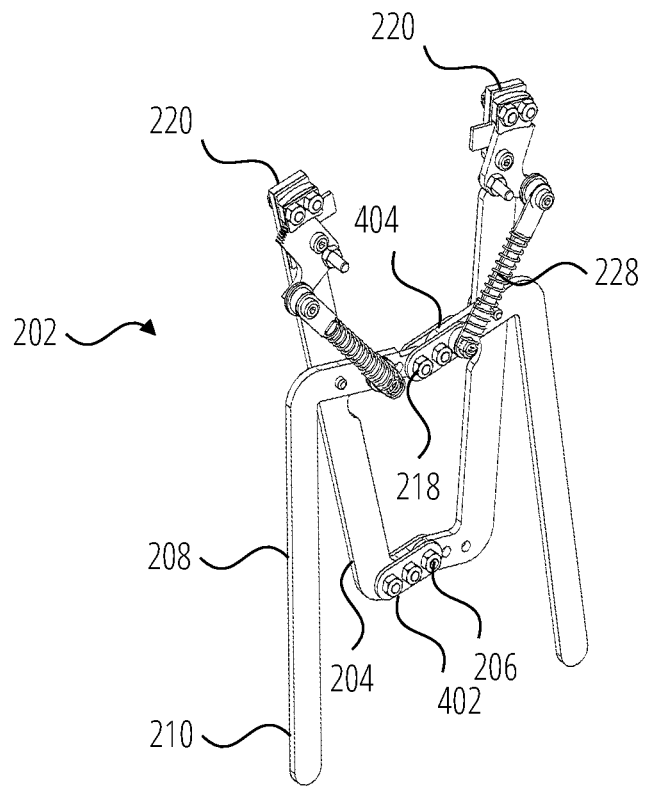
FIG. 4 is another view of the knot stretcher of FIG. 2.

In use, the operator attaches one of the tails of splice knot 118 to one of the clamping jaws 220 and the other twine tail of the splice knot 118 to the other clamping jaw 220 and then brings the handle portions 210 of operating levers 208 together as shown in FIG. 4. As the levers 208 pivot about the fixed pivot 216, the moving pivot 218 connecting the arm portions 212 of the levers 208 moves away from the pulling bar pivot 206 as the arm portions 212 move into a more generally parallel alignment. This movement of the levers 208 causes the pulling bars 204 pivot outward about the pulling bar pivot 206 thereby causing the clamping jaws 220 at distal ends of the pulling bars 204 to separate. The separation of the clamping jaws 220 pulls the twine tails of the splice knot 118 to make the knot stretch and create a very tight knot. As the levers 208 move to the maximum stretching position, the geometry of the elbow 214 and arm portion 212 of the lever 208 causes the motion of the clamping jaws 220 slow. Accordingly, the force put on the levers 208 is multiplied to the clamping jaws 220.

In one embodiment, the rod 228 comprises an upper overlapping bar 302 and a lower overlapping bar 304 surrounded by a biasing spring 306. A turning knob 308 on the crank 222 can be used to rotate the crank 222 so that the twine tail of the splice knot 118 can be inserted into the groove 226 of the clamping jaw 220. This allows the operator to rotate the crank 222 against the spring force of the biasing spring 306 using the turning knob 308 to position the crank 222 so that the twine tail can be placed in the groove 226. Then as the levers 208 are manipulated to stretch the knot as shown in FIG. 4, additional force is applied to the cranks 222 to further grasp the twin tails of the splice knot 118. Desirably, the crank 222 has serrated teeth 310 to better hold the twine tail of the splice knot 118.

As perhaps best seen in FIG. 4, a short segment 402 at the distal end of the pulling bar 204 at the pulling bar pivot 206 generally approaches a parallel alignment with the short segment 402 of the other pulling bar 204. In the lever position shown in FIG. 4, the dimension of the short segment 402 as compared to a long segment 404 of the arm portions 212 of the levers 208 causes the pulling bars 204 to pivot upon movement of the levers 208 ensuring that the clamping jaws 220 at the ends of the pulling bars 204 provides the necessary separating movement required to tighten the splice knot 118 attached to the knot stretcher 202.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

What is claimed is:

1. A knot stretcher for use in tightening splice knots that connect twine balls on an agricultural baler, wherein the splice knot has a pair of twine tails, the knot stretcher comprising:
   a pair of pulling bars connected at pulling bar pivot at one end of each of the pulling bars,
   a pair of levers, wherein one of the pair of levers is attached in a middle section of its respective pulling bar, each lever having a handle portion at one end and an arm portion extending from an elbow formed in the lever, wherein each lever attaches to its respective pulling bar with a fixed pivot located near the elbow and distal ends of the arm portions of the two levers are attached at a moving pivot; and
   a pair of clamping jaws, wherein one of the pair of clamping jaws is positioned on the respective pulling bar at an end opposite the pulling bar pivot, each clamping jaw including a rotating crank that mates with a clamp so that each of the clamping jaws is able to securely clamp a respective one of the twine tails of the splice knot that is to be tightened by the knot stretcher.

2. The knot stretcher of claim 1, further comprising a rod that extends from the arm portion to the crank so as to push the crank against the clamp so that the clamping jaw tightly grasps the twine tail.

3. The knot stretcher of claim 1, wherein the crank is rotatable to open the clamping jaw to allow the twine tail of the splice knot to be inserted into the groove.

4. The knot stretcher of claim 1, wherein one of the twine tails of splice knot is configured to be attached to one of the clamping jaws and the other twine tail of the splice knot to the other clamping jaw.

5. The knot stretcher of claim 4, wherein movement of the handle portions of operating levers together causes the levers to pivot about the fixed pivot and further causing the moving pivot connecting the arm portions of the levers to move away from the pulling bar pivot as the arm portions move into a more generally parallel alignment.

6. The knot stretcher of claim 5, wherein movement of the levers causes the pulling bars to pivot outward about the pulling bar pivot thereby causing the clamping jaws to separate, wherein separation of the clamping jaws is configured to pull the twine tails of the splice knot to tighten the splice knot.

\* \* \* \* \*